(12) United States Patent
Seeler et al.

(10) Patent No.: US 9,403,323 B2
(45) Date of Patent: Aug. 2, 2016

(54) PRINTING METHOD FOR PRODUCING THERMOMAGNETIC FORM BODIES FOR HEAT EXCHANGERS

(75) Inventors: Fabian Seeler, Dossenheim (DE); Georg Degen, Lorsch (DE); Bernard Hendrik Reesink, Winterswijk-Kotten (NL); Jurgen Kaczun, Wachenheim (DE)

(73) Assignee: BASF SE, Ludwigshafen (DE)

( * ) Notice: Subject to any disclaimer, the term of this patent is extended or adjusted under 35 U.S.C. 154(b) by 400 days.

(21) Appl. No.: 13/259,882

(22) PCT Filed: Mar. 22, 2010

(86) PCT No.: PCT/EP2010/053684
§ 371 (c)(1),
(2), (4) Date: Sep. 23, 2011

(87) PCT Pub. No.: WO2010/108883
PCT Pub. Date: Sep. 30, 2010

(65) Prior Publication Data
US 2012/0033002 A1    Feb. 9, 2012

(30) Foreign Application Priority Data
Mar. 24, 2009 (EP) .................................... 09156046

(51) Int. Cl.
*C09K 5/00* (2006.01)
*B29C 67/00* (2006.01)
*C09K 3/18* (2006.01)
*C09K 5/14* (2006.01)
*B22F 3/105* (2006.01)
*B22F 5/10* (2006.01)
*C22C 1/04* (2006.01)
*H01F 1/01* (2006.01)
*B29L 31/18* (2006.01)

(52) U.S. Cl.
CPC ............ *B29C 67/0081* (2013.01); *B22F 3/105* (2013.01); *B22F 5/10* (2013.01); *C09K 3/18* (2013.01); *C09K 5/14* (2013.01); *C22C 1/0491* (2013.01); *H01F 1/015* (2013.01); *H01F 1/017* (2013.01); *B22F 3/1055* (2013.01); *B29L 2031/18* (2013.01); *C22C 2202/02* (2013.01)

(58) Field of Classification Search
CPC ............ C09K 3/10; C09K 3/18; C09K 5/00; C09K 5/08; C09K 5/14; C09K 2211/18
USPC ....... 252/70, 71, 62.3 T, 62.3 R, 67; 148/300, 148/306, 312, 313, 314, 420, 425, 426; 62/3.1, 3.2; 419/2, 30, 38
See application file for complete search history.

(56) References Cited

U.S. PATENT DOCUMENTS

| 428,057 | A | 5/1890 | Tesla | |
|---|---|---|---|---|
| 6,557,354 | B1 * | 5/2003 | Chu et al. | 62/3.2 |
| 6,852,272 | B2 * | 2/2005 | Artz et al. | 419/2 |
| 7,069,729 | B2 * | 7/2006 | Bruck et al. | 62/3.1 |
| 2002/0108381 | A1 * | 8/2002 | Bell | 62/3.3 |
| 2004/0039470 | A1 * | 2/2004 | Gervasi et al. | 700/119 |
| 2005/0017394 | A1 | 1/2005 | Hochsmann et al. | |
| 2005/0212888 | A1 | 9/2005 | Lehmann et al. | |
| 2005/0260093 | A1 | 11/2005 | Artz et al. | |
| 2006/0117758 | A1 | 6/2006 | Brück et al. | |
| 2006/0237159 | A1 | 10/2006 | Hochsmann | |
| 2007/0060734 | A1 | 3/2007 | Bruchmann et al. | |
| 2011/0037342 | A1 | 2/2011 | Degen et al. | |
| 2011/0042608 | A1 | 2/2011 | Reesink | |
| 2011/0168045 | A1 | 7/2011 | Bruchmann et al. | |
| 2011/0292159 | A1 | 12/2011 | Jäger et al. | |
| 2011/0298878 | A1 | 12/2011 | Jäger et al. | |
| 2011/0310205 | A1 | 12/2011 | Jäger et al. | |
| 2012/0125015 | A1 | 5/2012 | Renze et al. | |
| 2012/0227926 | A1 * | 9/2012 | Field et al. | 165/10 |

FOREIGN PATENT DOCUMENTS

| EP | 0431924 | A2 | 6/1991 |
|---|---|---|---|
| EP | 1485 255 | A1 | 12/2004 |
| EP | 08155255 | | 1/2011 |
| JP | 2007-291437 | | 11/2007 |
| JP | 2007 291437 | A | 11/2007 |
| JP | 2008-527301 | | 7/2008 |
| WO | WO-02/36695 | A1 | 5/2002 |
| WO | WO-2004/068512 | A1 | 8/2004 |
| WO | WO-2004/112988 | A2 | 12/2004 |
| WO | WO-2006/074790 | A1 | 7/2006 |
| WO | WO-2009/133048 | A1 | 11/2009 |
| WO | WO 2010/037691 | A1 | 4/2010 |
| WO | WO 2010/069902 | A1 | 6/2010 |

OTHER PUBLICATIONS

O. Tegus, et al., "Transition-metal-based magnetic refrigerants for room-temperature applications", Nature, vol. 415, Jan. 10, 2002, pp. 150-152.
"The Fastest, Most Affordable Color 3D Printing", Z Corporation, XP 002596768, 2009, 6 pages.
Combined Office Action and Search Report issued Jul. 16, 2014, in Chinese Patent Application No. 201080022284.4 with English translation and English translation of category of cited documents.
European Office Action issued Mar. 17, 2014 in Application No. EP20100709841, filed Mar. 22, 2010.
Office Action dated Mar. 30, 2016 in Korean Patent Application No. 10-2011-7025149, filed Oct. 24, 2011 (with English translation).

* cited by examiner

*Primary Examiner* — Jane L Stanley
(74) *Attorney, Agent, or Firm* — Oblon, McClelland, Maier & Neustadt, L.L.P.

(57) ABSTRACT

In a method for producing form bodies for heat exchangers, comprising a thermomagnetic material, said form bodies having channels for passage of a fluid heat exchange medium, a powder of the thermomagnetic material is introduced into a binder, the resulting molding material is applied to a carrier by printing methods, and the binder and if appropriate a carrier are removed subsequently and the resulting green body is sintered.

7 Claims, No Drawings

PRINTING METHOD FOR PRODUCING THERMOMAGNETIC FORM BODIES FOR HEAT EXCHANGERS

PRIORITY

Priority is claimed as a national stage application, under 35 U.S.C. §371, to PCT/EP2010/053684, filed Mar. 22, 2010, which claims priority to European application 09156046.6, filed Mar. 24, 2009. The disclosures of the aforementioned priority applications are incorporated herein by reference in their entirety.

BACKGROUND

The invention relates to printing methods for producing thermomagnetic form bodies for heat exchangers, to the corresponding form bodies, and to their use in refrigerators, air conditioning units, heat pumps or in power generation by direct conversion of heat.

Thermomagnetic materials, also referred to as magnetocaloric materials, can be used for cooling, for example in refrigerators or air conditioning units, in heat pumps or for direct generation of power from heat without intermediate connection of a conversion to mechanical energy.

Such materials are known in principle and are described, for example, in WO 2004/068512. Magnetic cooling techniques are based on the magnetocaloric effect (MCE) and may constitute an alternative to the known vapor circulation cooling methods. In a material which exhibits a magnetocaloric effect, the alignment of randomly aligned magnetic moments by an external magnetic field leads to heating of the material. This heat can be removed from the MCE material to the surrounding atmosphere by a heat transfer. When the magnetic field is then switched off or removed, the magnetic moments revert back to a random arrangement, which leads to cooling of the material below ambient temperature. This effect can be exploited for cooling purposes; see also Nature, Vol. 415, Jan. 10, 2002, pages 150 to 152. Typically, a heat transfer medium such as water is used for heat removal from the magnetocaloric material.

The materials used in thermomagnetic generators are likewise based on the magnetocaloric effect. In a material which exhibits a magnetocaloric effect, the alignment of randomly aligned magnetic moments by an external magnetic field leads to heating of the material. This heat can be released by the MCE material into the surrounding atmosphere by a heat transfer. When the magnetic field is then switched off or removed, the magnetic moments revert back to a random alignment, which leads to cooling of the material below ambient temperature. This effect can be exploited firstly for cooling purposes, and secondly for conversion of heat to electrical energy.

The magnetocaloric generation of electrical energy is associated with magnetic heating and cooling. At the time of first conception, the process for energy generation was described as pyromagnetic energy generation. Compared to devices of the Peltier or Seebeck type, these magnetocaloric devices can have a significantly higher energy efficiency.

The research into this physical phenomenon began in the late 19th century, when two scientists, Tesla and Edison, filed a patent on pyromagnetic generators. In 1984, Kirol described numerous possible applications and conducted thermodynamic analyses thereof. At that time, gadolinium was considered to be a potential material for applications close to room temperature.

A pyromagnetoelectric generator is described, for example, by N. Tesla in U.S. Pat. No. 428,057. It is stated that the magnetic properties of iron or other magnetic substances can be destroyed partially or entirely or can disappear as a result of heating to a particular temperature. In the course of cooling, the magnetic properties are re-established and return to the starting state. This effect can be exploited to generate electrical power. When an electrical conductor is exposed to a varying magnetic field, the changes in the magnetic field lead to the induction of an electrical current in the conductor. When, for example, the magnetic material is surrounded by a coil and is then heated in a permanent magnetic field and then cooled, an electrical current is induced in the coil in the course of heating and cooling in each case. This allows thermal energy to be converted to electrical energy, without an intermediate conversion to mechanical work. In the process described by Tesla, iron, as the magnetic substance, is heated by means of an oven or a closed fireplace and then cooled again.

For the thermomagnetic or magnetocaloric applications, the material should permit efficient heat exchange in order to be able to achieve high efficiencies. Both in the course of cooling and in the course of power generation, the thermomagnetic material is used in a heat exchanger.

European patent application EP 08155255.6, which has an earlier priority date but was yet to be published at the priority date of the present application, filed Apr. 28, 2008, with the title "Open-cell porous form bodies for heat exchangers", describes the production of heat exchanger form bodies from thermomagnetic materials by introducing the thermomagnetic powder into a suitable organic binder and filling into a mold. The filling can be affected, for example, by casting or injection molding. The polymer is then removed catalytically or thermally and sintered until a porous body with open-cell structure is formed.

SUMMARY

It is an object of the present invention to provide thermomagnetic form bodies which are suitable for use in heat exchangers, especially for cooling purposes or for power generation, and processes for production thereof. These form bodies should allow high heat transfer, have a low flow resistance for heat exchange media and possess a high magnetocaloric density.

The object is achieved in accordance with the invention by a method for producing form bodies for heat exchangers, comprising a thermomagnetic material selected from (1) compounds of the general formula (I)

$$(A_yB_{y-1})_{2+\delta}C_wD_xE_z \qquad (I)$$

where
A is Mn or Co,
B is Fe, Cr or Ni,
C, D and E at least two of C, D and E are different, have a non-vanishing concentration and are selected from P, B, Se, Ge, Ga, Si, Sn, N, As and Sb,
δ is a number in the range from −0.2 to 0.2,
w, x, y, z are numbers in the range from 0 to 1, where w+x+z=1;

(2) La- and Fe-based compounds of the general formulae (II) and/or (III) and/or (IV)

$$La(Fe_xAl_{1-x})_{13}H_y \text{ or } La(Fe_xSi_{1-x})_{13}H_y \qquad (II)$$

where
x is a number from 0.7 to 0.95,
y is a number from 0 to 3;

$$La(Fe_xAl_yCo_z)_{13} \text{ or } La(Fe_xSi_yCo_z)_{13} \qquad (III)$$

where
x is a number from 0.7 to 0.95,
y is a number from 0.05 to 1−x,
z is a number from 0.005 to 0.5;

$$LaMn_xFe_{2-x}Ge \quad (IV)$$

where
x is a number from 1.7 to 1.95 and
(3) Heusler alloys of the MnTP type where T is a transition metal and P is a p-doping metal having an electron count per atom e/a in the range from 7 to 8.5,
(4) Gd- and Si-based compounds of the general formula (V)

$$Gd_5(Si_xGe_{1-x})_4 \quad (V)$$

where x is a number from 0.2 to 1,
(5) Fe$_2$P-based compounds,
(6) manganites of the perovskite type,
(7) compounds which comprise rare earth elements and are of the general formulae (VI) and (VII)

$$Tb_5(Si_{4-x}Ge_x) \quad (VI)$$

where x=0, 1, 2, 3, 4, $$XTiGe \quad (VII)$$

where X=Dy, Ho, Tm,
(8) Mn- and Sb- or As-based compounds of the general formulae (VIII) and (IX)

$$Mn_{2-x}Z_xSb \quad (VIII)$$

$$Mn_2Z_xSb_{1-x} \quad (IX)$$

where
Z is Cr, Cu, Zn, Co, V, As, Ge,
x is from 0.01 to 0.5,
where Sb may be replaced by As when Z is not As,
said form bodies having channels for passage of a fluid heat exchange medium, which comprises introducing a powder of the thermomagnetic material into a binder, applying the resulting molding material to a carrier by printing methods and subsequently removing the binder and if appropriate the carrier, and sintering the resulting green body.

It has been found in accordance with the invention that printing methods are particularly suitable for producing form bodies for heat exchangers based on thermomagnetic materials. The printing methods firstly allow fine structuring of channels to be achieved in the heat exchanger; secondly, different thermomagnetic materials can be combined in order to be able to utilize the magnetocaloric effect within a wide temperature range.

For an effective use of the thermomagnetic materials, fine structuring of the brittle material in the heat exchanger is important. This problem is solved in accordance with the invention by the printing of molding materials which comprise the powder of the thermomagnetic material in a binder, in order thus to produce very finely structured channels for heat exchange fluids.

DESCRIPTION

In the printing method, one or more layers of the molding material are printed onto a suitable carrier. This allows, in a simple and inexpensive manner, virtually any form thermomagnetic materials which exhibit a high surface-to-volume ratio and an optimized fine structure for efficient heat transfer to be made available.

The molding materials used in accordance with the invention firstly comprise a powder of the thermomagnetic material. This powder preferably has a mean particle size in the range from 0.1 to 100 μm, more preferably 0.5 to 30 μm. The mean particle size is determined, for example, by classification or counting/microscopy.

The powder of the thermomagnetic material is introduced into a binder which allows fine distribution of the thermomagnetic material powder in the binder. It is possible to use any suitable binder, but the binder is generally a polymeric binder. In addition to the binder, it is possible, if desired, to additionally use a solvent or dispersant in order to adjust the free flow and the mechanical properties of the molding material to the particular printing method. The molding material may, for example, be a thermoplastic molding material. The molding material is printed with the desired form onto a suitable, for example, polymeric, carrier. This carrier, which is coated with the thermomagnetic material, can then be used directly, for example, in a magnetic cooling device or for heat transfer. It is also possible and frequently preferred to remove the binder after the printing and to sinter the resulting green body. In this case, it is likewise possible to remove the carrier, if desired, before, in the course of or after the binder removal, or before, in the course of or after the sintering.

When different thermomagnetic materials with different Curie temperatures are printed onto the carrier either alongside one another or one on top of another, the temperature range in which the heat exchanger works can be widened. Alternatively, the molding material may comprise more than one thermomagnetic material. The molding materials can also be printed in such a way that the concentrations of the different materials in the printed form vary, for example along one or two axes of a printed surface, such that a continuous transition from one thermomagnetic material to the next is possible.

The molding material may comprise additional additives for improving the mechanical properties, the corrosion resistance and/or the conductivity. The additives can be adjusted to the particular requirements on the heat exchanger.

The binder can be removed thermally in the course of sintering, and likewise the carrier. Removal by chemical conversion is also possible.

It has been found in accordance with the invention that the aforementioned heat exchangers comprising the thermomagnetic materials can be used advantageously in heat exchangers, magnetic cooling, heat pumps or thermomagnetic generators or regenerators.

The form body preferably has continuous channels. This allows the flow of a fluid, preferably liquid, heat carrier medium such as water, water/alcohol mixtures, water/salt mixtures or gases such as air or noble gases. Preference is given to using water or water/alcohol mixtures, where the alcohol may be a mono- or polyhydric alcohol. For example, it may be glycols.

The proportion of continuous channels can be adjusted according to the practical requirements. The number and the diameter of the channels should be sufficiently high that rapid heat removal through a fluid heat transfer medium can be achieved. In the case or rapid heat removal, the material can be introduced into the magnetic field or removed from it again at high frequency. In this case, the "porosity" is high. In order to be able to exchange a large amount of heat, a large amount of material and hence a low "porosity" are needed. In the case of a low "porosity", a large amount of material can be introduced into the magnetic field, and a large amount of heat can be transferred. However, this can impair heat exchange via a heat carrier medium. As a result, the "porosity" can be selected freely according to the particular requirements, also in accordance with the thermomagnetic material used.

In one embodiment of the invention, the form body therefore has a low to moderate "porosity" of preferably from 30 to 60% and more preferably from 30 to 50%. In a further embodiment, a "high-porosity" form body has a "porosity" of preferably from 60 to 95% and especially from 80 to 95%.

The "porosity" is in each case based on the volume.

The mean channel diameter is generally from 0.1 to 2000 µm, preferably from 0.1 to 300 µm, more preferably from 0.3 to 200 µm. The mean channel diameter can also be established according to the particular requirements.

The volume of the flow channels, based on the total volume of the form body, is preferably in the range from 10 to 80%, especially in the range from 30 to 60%.

In one embodiment, the form bodies have a ratio of surface to volume of at least $250 \text{ m}^2/\text{m}^3$. In a specific embodiment, the ratio of surface to volume may also be at least $500 \text{ m}^2/\text{m}^3$. The surface area and the pore volume are determined by mercury porosimetry, or are calculated proceeding therefrom. It is also possible to use optical analysis methods. The ratio can also be calculated for structured packings. Typical form bodies have external dimensions in the range from 1 to 10 cm, e.g. 1 cm×1 cm×5-10 cm.

The materials used in accordance with the invention are known in principle and some are described, for example, in WO 2004/068512.

The thermomagnetic material is selected from the above compounds (1) to (8).

Particular preference is given in accordance with the invention to the thermomagnetic materials selected from compounds (1), (2) and (3), and also (5).

Materials particularly suitable in accordance with the invention are described, for example, in WO 2004/068512, Rare Metals, Vol. 25, 2006, pages 544 to 549, J. Appl. Phys. 99,08Q107 (2006), Nature, Vol. 415, Jan. 10, 2002, pages 150 to 152 and Physica B 327 (2003), pages 431 to 437.

In the aforementioned compounds of the general formula (I), C, D and E are preferably identical or different and are selected from at least one of P, Ge, Si, Sn and Ga.

The metal-based material of the general formula (I) is preferably selected from at least quaternary compounds which, as well as Mn, Fe, P and optionally Sb, additionally comprise Ge or Si or As or Ge and Si, Ge and As or Si and As, or Ge, Si and As.

Preferably at least 90% by weight, more preferably at least 95% by weight, of component A is Mn. Preferably at least 90% by weight, more preferably at least 95% by weight, of B is Fe. Preferably at least 90% by weight, more preferably at least 95% by weight, of C is P. Preferably at least 90% by weight, more preferably at least 95% by weight, of D is Ge. Preferably at least 90% by weight, more preferably at least 95% by weight, of E is Si.

The material preferably has the general formula $MnFe(P_wGe_xSi_z)$.

x is preferably a number in the range from 0.3 to 0.7, w is less than or equal to 1−x and z corresponds to 1−x−w.

The material preferably has the crystalline hexagonal $Fe_2P$ structure. Examples of suitable materials are $MnFeP_{0.45 \text{ to } 0.7}$, $Ge_{0.55 \text{ to } 0.30}$ and $MnFeP_{0.5 \text{ to } 0.70}$, $(Si/Ge)_{0.5 \text{ to } 0.30}$.

Suitable compounds are additionally $M_{n1+x}Fe_{1-x}P_{1-y}Ge_y$ with x in the range from −0.3 to 0.5, y in the range from 0.1 to 0.6. Likewise suitable are compounds of the general formula $Mn_{1+x}Fe_{1-x}P_{1-y}Ge_{y-z}Sb_z$ with x in the range from −0.3 to 0.5, y in the range from 0.1 to 0.6 and z less than y and less than 0.2. Also suitable are compounds of the formula $Mn_{1+x}Fe_{1-x}P_{1-y}Ge_{y-z}Si_z$ with x in the range from 0.3 to 0.5, y in the range from 0.1 to 0.66, z less than or equal to y and less than 0.6.

Also suitable are further $Fe_2P$-based compounds proceeding from $Fe_2P$ and $FeAs_2$, optionally Mn and P. They correspond, for example, to the general formulae $MnFe_{1-x}Co_xGe$, where x=0.7-0.9, $Mn_{5-x}Fe_xSi_3$ where x=0-5, $Mn_5Ge_{3-x}Si_x$ where x=0.1-2, $Mn_5Ge_{3-x}Sb_x$ where x=0-0.3, $Mn_{2-x}Fe_xGe_2$ where x=0.1-0.2 $(Fe_{1-x}Mn_x)_3C$, $Mn_{3-x}Co_xGaC$ where x=0-0.05.

Preferred La- and Fe-based compounds of the general formulae (II) and/or (III) and/or (IV) are $La(Fe_{0.90}Si_{0.10})_{13}$, $La(Fe_{0.89}Si_{0.11})_{13}$, $La(Fe_{0.880}Si_{0.120})_{13}$, $La(Fe_{0.877}Si_{0.123})_{13}$, $LaFe_{11.8}Si_{1.2}$, $La(Fe_{0.88}Si_{0.12})_{13}H_{0.5}$, $La(Fe_{0.88}Si_{0.12})_{13}H_{1.0}$, $LaFe_{11.7}Si_{1.3}H_{1.1}$, $La(Fe_{11.57}Si_{1.43}H_{1.3}$, $La(Fe_{0.88}Si_{0.12})H_{1.5}$, $LaFe_{11.2}Co_{0.7}Si_{1.1}$, $LaFe_{11.5}Al_{1.5}C_{0.1}$, $LaFe_{11.5}Al_{1.5}C_{0.2}$, $LaFe_{11.5}Al_{1.5}C_{0.4}$, $LaFe_{11.5}Al_{1.5}Co_{0.5}$, $La(Fe_{0.94}Co_{0.06})_{11.83}Al_{1.17}$, $La(Fe_{0.92}Co_{0.08})_{11.83}Al_{1.17}$.

Suitable manganese-comprising compounds are MnFeGe, $MnFe_{0.9}Co_{0.1}Ge$, $MnFe_{0.8}Co_{0.2}Ge$, $MnFe_{0.7}Co_{0.3}Ge$, $MnFe_{0.6}Co_{0.4}Ge$, $MnFe_{0.5}Co_{0.5}Ge$, $MnFe_{0.4}Co_{0.6}Ge$, $MnFe_{0.3}Co_{0.7}Ge$, $MnFe_{0.2}Co_{0.8}Ge$, $MnFe_{0.15}Co_{0.85}Ge$, $MnFe_{0.1}Co_{0.9}Ge$, MnCoGe, $Mn_5Ge_{2.5}Si_{0.5}$, $Mn_5Ge_2Si$, $Mn_5Ge_{1.5}Si_{1.5}$, $Mn_5GeSi_2$, $Mn_5Ge_3$, $Mn_5Ge_{2.9}Sb_{0.1}$, $Mn_5Ge_{2.8}Sb_{0.2}$, $Mn_5Ge_{2.7}Sb_{0.3}$, $LaMn_{1.9}Fe_{0.1}Ge$, $LaMn_{1.85}Fe_{0.15}Ge$, $LaMn_{1.8}Fe_{0.2}Ge$, $(Fe_{0.9}Mn_{0.1})_3C$, $(Fe_{0.8}Mn_{0.2})_3C$, $(Fe_{0.7}Mn_{0.3})C$, $Mn_3GaC$, MnAs, (Mn, Fe)As, $Mn_{1+\delta}As_{0.8}Sb_{0.2}$, $MnAs_{0.75}Sb_{0.25}$, $Mn_{1.1}As_{0.75}Sb_{0.25}$, $Mn_{1.5}As_{0.75}Sb_{0.25}$.

Heusler alloys suitable in accordance with the invention are, for example, $Ni_2MnGa$, $Fe_2MnSi_{1-x}Ge_x$ with x=0-1 such as $Fe_2MnSi_{0.5}Ge_{0.5}$, $Ni_{52.9}Mn_{22.4}Ga_{24.7}$, $Ni_{50.9}Mn_{24.7}Ge_{24.4}$, $Ni_{55.2}Mn_{18.6}Ge_{26.2}$, $N_{51.6}Mn_{24.7}Ga_{23.8}$, $Ni_{52.7}Mn_{23.9}Ga_{23.4}$, CoMnSb, $CoNb_{0.2}Mn_{0.8}Sb$, $CoNb_{0.4}Mn_{0.6}SB$, $CoNb_{0.6}Mn_{0.4}Sb$, $Ni_{50}Mn_{35}Sn_{15}$, $Ni_{50}Mn_{37}Sn_{13}$, $MnFeP_{0.45}As_{0.55}$, $MnFeP_{0.47}As_{0.53}$, $Mn_{1.1}Fe_{0.9}P_{0.47}As_{0.53}$, $MnFeP_{0.89-x}Si_xGe_{0.11}$, X=0.22, X=0.26, X=0.30, X=0.33.

Additionally suitable are $Fe_{90}Zr_{10}$, $Fe_{82}Mn_8Zr_{10}$, $Co_{66}Nb_9Cu_1Si_2B_{12}$, $Pd_{40}Ni_{22.5}Fe_{17.5}P_{20}$, FeMoSiBCuNb, $Gd_{70}Fe_{30}$, GdNiAl, $NdFe_{12}B_6GdMn_2$.

Manganites of the perovskite type are, for example, $La_{0.6}Ca_{0.4}MnO_3$, $La_{0.67}Ca_{0.33}MnO_3$, $La_{0.8}Ca_{0.2}MnO_3$, $La_{0.7}Ca_{0.3}MnO_3$, $La_{0.958}Li_{0.025}Ti_{0.1}Mn_{0.9}O_3$, $La_{0.65}Ca_{0.35}Ti_{0.1}Mn_{0.9}O_3$, $La_{0.799}Na_{0.199}MnO_{2.97}$, $La_{0.88}Na_{0.099}Mn_{0.977}O_3$, $La_{0.877}K_{0.096}Mn_{0.974}O_3$, $La_{0.65}Sr_{0.35}Mn_{0.95}O_3$, $La_{0.7}Nd_{0.1}Na_{0.2}MnO_3$, $La_{0.5}Ca_{0.3}Sr_{0.2}MnO_3$.

Gd- and Si-based compounds of the general formula (V)

$$Gd_9(Si_xGe_{1-x})_4$$

where x is a number from 0.2 to 1 are, for example, $Gd_5(Si_{0.5}Ge_{0.5})_4$, $Gd_5(Si_{0.425}Ge_{0.575})_4$, $Gd_5(Si_{0.45}Ge_{0.55})_4$, $Gd_5(Si_{0.369}Ge_{0.639})_4$, $Gd_5(Si_{0.3}Ge_{0.7})_4$, $Gd_5(Si_{0.25}Ge_{0.75})_4$.

Compounds comprising rare earth elements are $Tb_5(Si_{4-x}Ge_x)$ with x=0, 1, 2, 3, 4 or XTiGe with X=Dy, Ho, Tm, for example $Tb_5Si_4$, $Tb_5(Si_3Ge)$, $Tb(Si_2Ge_2)$, $Tb_5Ge_4$, DyTiGe, HoTiGe, TmTiGe.

Mn- and Sb- or As-based compounds of the general formulae (VIII) and (IX) preferably have the definitions of z=0.05 to 0.3, Z=Cr, Cu, Ge, As, Co.

The thermomagnetic materials used in accordance with the invention can be produced in any suitable manner.

The thermomagnetic materials are produced, for example, by solid phase reaction of the starting elements or starting alloys for the material in a ball mill, subsequent pressing, sintering and heat treatment under inert gas atmosphere and subsequent slow cooling to room temperature. Such a process is described, for example, in J. Appl. Phys. 99, 2006, 08Q107.

Processing via melt spinning is also possible. This makes possible a more homogeneous element distribution which leads to an improved magnetocaloric effect; cf. Rare Metals, Vol. 25, October 2006, pages 544 to 549. In the process described there, the starting elements are first induction-melted in an argon gas atmosphere and then sprayed in the molten state through a nozzle onto a rotating copper roller. There follows sintering at 1000° C. and slow cooling to room temperature.

In addition, reference may be made to WO 2004/068512 for the production.

The materials obtained by these methods frequently exhibit high thermal hysteresis. For example, in compounds of the $Fe_2P$ type substituted by germanium or silicon, large values for thermal hysteresis are observed within a wide range of 10 K or more.

Preference is therefore given to a method for producing the thermomagnetic materials, comprising the following steps:
a) reacting chemical elements and/or alloys in a stoichiometry which corresponds to the metal-based material in the solid and/or liquid phase,
b) if appropriate converting the reaction product from stage a) to a solid,
c) sintering and/or heat treating the solid from stage a) or b),
d) quenching the sintered and/or heat-treated solid from stage c) at a cooling rate of at least 100 K/s.

The thermal hysteresis can be reduced significantly and a large magnetocaloric effect can be achieved when the metal-based materials are not cooled slowing to ambient temperature after the sintering and/or heat treatment, but rather are quenched at a high cooling rate. This cooling rate is at least 100 K/s. The cooling rate is preferably from 100 to 10 000 K/s, more preferably from 200 to 1300 K/s. Especially preferred cooling rates are from 300 to 1000 K/s.

The quenching can be achieved by any suitable cooling processes, for example by quenching the solid with water or aqueous liquids, for example cooled water or ice/water mixtures. The solids can, for example, be allowed to fall into ice-cooled water. It is also possible to quench the solids with subcooled gases such as liquid nitrogen. Further processes for quenching are known to those skilled in the art. What is advantageous here is controlled and rapid cooling.

The rest of the production of the thermomagnetic materials is less critical, provided that the last step comprises the quenching of the sintered and/or heat-treated solid at the inventive cooling rate. The process may be applied to the production of any suitable thermomagnetic materials for magnetic cooling, as described above.

In step (a) of the method, the elements and/or alloys which are present in the later thermomagnetic material are converted in a stoichiometry which corresponds to the thermomagnetic material in the solid or liquid phase.

Preference is given to performing the reaction in stage a) by combined heating of the elements and/or alloys in a closed vessel or in an extruder, or by solid phase reaction in a ball mill. Particular preference is given to performing a solid phase reaction, which is effected especially in a ball mill. Such a reaction is known in principle; cf. the documents cited above. Typically, powders of the individual elements or powders of alloys of two or more of the individual elements which are present in the later thermomagnetic material are mixed in pulverulent form in suitable proportions by weight. If necessary, the mixture can additionally be ground in order to obtain a microcrystalline powder mixture. This powder mixture is preferably heated in a ball mill, which leads to further comminution and also good mixing, and to a solid phase reaction in the powder mixture. Alternatively, the individual elements are mixed as a powder in the selected stoichiometry and then melted.

The combined heating in a closed vessel allows the fixing of volatile elements and control of the stoichiometry. Specifically in the case of use of phosphorus, this would evaporate easily in an open system.

The reaction is followed by sintering and/or heat treatment of the solid, for which one or more intermediate steps can be provided. For example, the solid obtained in stage a) can be subjected to forming before it is sintered and/or heat treated.

Alternatively, it is possible to send the solid obtained from the ball mill to a melt-spinning process. Melt-spinning processes are known per se and are described, for example, in Rare Metals, Vol. 25, October 2006, pages 544 to 549, and also in WO 2004/068512.

In these processes, the composition obtained in stage a) is melted and sprayed onto a rotating cold metal roller. This spraying can be achieved by means of elevated pressure upstream of the spray nozzle or reduced pressure downstream of the spray nozzle. Typically, a rotating copper drum or roller is used, which can additionally be cooled if appropriate. The copper drum preferably rotates at a surface speed of from 10 to 40 m/s, especially from 20 to 30 m/s. On the copper drum, the liquid composition is cooled at a rate of preferably from $10^2$ to $10^7$ K/s, more preferably at a rate of at least $10^4$ K/s, especially with a rate of from 0.5 to $2 \times 10^6$ K/s.

The melt-spinning, like the reaction in stage a) too, can be performed under reduced pressure or under an inert gas atmosphere.

The melt-spinning achieves a high processing rate, since the subsequent sintering and heat treatment can be shortened. Specifically on the industrial scale, the production of the thermomagnetic materials thus becomes significantly more economically viable. Spray-drying also leads to a high processing rate. Particular preference is given to performing melt spinning.

Alternatively, in stage b), spray cooling can be carried out, in which a melt of the composition from stage a) is sprayed into a spray tower. The spray tower may, for example, additionally be cooled. In spray towers, cooling rates in the range from $10^3$ to $10^5$ K/s, especially about $10^4$ K/s, are frequently achieved.

The sintering and/or heat treatment of the solid is effected in stage c) preferably first at a temperature in the range from 800 to 1400° C. for sintering and then at a temperature in the range from 500 to 750° C. for heat treatment. For example, the sintering can then be effected at a temperature in the range from 500 to 800° C. For form bodies/solids, the sintering is more preferably effected at a temperature in the range from 1000 to 1300° C., especially from 1100 to 1300° C. The heat treatment can then be effected, for example, at from 600 to 700° C.

The sintering is performed preferably for a period of from 1 to 50 hours, more preferably from 2 to 20 hours, especially from 5 to 15 hours. The heat treatment is performed preferably for a period in the range from 10 to 100 hours, more preferably from 10 to 60 hours, especially from 30 to 50 hours. The exact periods can be adjusted to the practical requirements according to the materials.

In the case of use of the melt-spinning process, the period for sintering or heat treatment can be shortened significantly, for example to periods of from 5 minutes to 5 hours, preferably from 10 minutes to 1 hour. Compared to the otherwise customary values of 10 hours for sintering and 50 hours for heat treatment, this results in a major time advantage.

The sintering/heat treatment results in partial melting of the particle boundaries, such that the material is compacted further.

The melting and rapid cooling in stage b) thus allows the duration of stage c) to be reduced considerably. This also allows continuous production of the thermomagnetic materials.

The inventive form body may be present, for example, in the form of a slab, honeycomb, a monolith, or in the form of a coating on a carrier.

The form bodies are produced by printing methods. It is possible to use any suitable printing methods in which, instead of printing inks, the molding materials comprising the thermomagnetic material are used. Customary suitable printing methods include, for example, screenprinting, flexographic printing and gravure printing. These methods are known per se to those skilled in the art. In addition, especially to form larger three-dimensional structures, it is possible to use inkjet printing, laser transfer printing, as described, for example, in EP-A-1485 255, and rapid prototyping/3D printing. To this end, the thermomagnetic material powder is first introduced into the binder. Based on the solids content of the resulting molding material, preferably 50 to 99% by weight, more preferably 60 to 98% by weight, of the thermomagnetic material is present. The remaining portion is divided between binders, optional solvents or dispersants and further additives. In order to be able to print with the molding material, the molding material has to be dispersed in a suitable solvent or a solvent mixture. The ratio of solid molding material and solvent depends on the particular printing method.

The printing uses a solvent-containing dispersion of the thermomagnetic particles, which may additionally comprise a binder. In 3D printing, generally only binder is applied to initially charged powder of the thermomagnetic material.

The binder used in the 3D printing is preferably a polymeric binder, in which case the resulting thermoplastic molding material is first subjected to the printing method, then the binder is removed and the resulting green body is sintered. It is also possible to coat the powder of the thermomagnetic material with a polymeric binder and then to form the form body.

According to the invention, it is possible to use any suitable organic binders which can be used as binders for thermomagnetic materials. These are especially oligomeric or polymeric systems.

Useful organic binders include especially natural and synthetic polymers which may be chemically or physically curing, e.g. air-curing, radiation-curing or heat-curing.

Preferred polymers are ABS (acrylonitrile-butadiene-styrene); ASA (acrylonitrile-styrene-acrylate); acrylated acrylates; alkyd resins; alkylvinyl acetates; alkylene-vinyl acetate copolymers, in particular methylene-vinyl acetate, ethylene-vinyl acetate, butylene-vinyl acetate; alkylene-vinyl chloride copolymers; amino resins; aldehyde resins and ketone resins; cellulose and cellulose derivatives, especially alkylcellulose, cellulose esters such as acetates, propionates, butyrates, cellulose ethers, carboxyalkylcelluloses, cellulose nitrate; epoxy acrylates; epoxy resins; modified epoxy resins, e.g. bifunctional or polyfunctional bisphenol A or bisphenol F resins, epoxy-novolac resins, brominated epoxy resins, cycloaliphatic epoxy resins; aliphatic epoxy resins, glycidic ethers, vinyl ethers, ethylene-acrylic acid copolymers; hydrocarbon resins; MABS (transparent ABS comprising acrylate units); melamine resins, maleic anhydride copolymers; methacrylates, optionally amine-functionalized; natural rubber; synthetic rubber; chlorinated rubber; natural resins; rosins; shellac, phenolic resins; polyesters; polyester resins, such as phenyl ester resins; polysulfones; polyether sulfones; polyamides; polyimides; polyanilines; polypyrroles; polybutylene terephthalate (PBT); polycarbonate (for example MAKROLON® from Bayer MaterialScience AG); polyester acrylates; polyether acrylates; polyethylene; polyethylene-thiophenes; polyethylene naphthalates; polyethylene terephthalate (PET); polyethylene terephthalate-glycol (PETG); polypropylene; polymethyl methacrylate (PMMA); polyphenylene oxide (PPO); polystyrenes (PS); polytetrafluoroethylene (PTFE); polytetrahydrofuran; polyethers (for example polyethylene glycol, polypropylene glycol), polyvinyl compounds, in particular polyvinyl chloride (PVC), PVC copolymers, PVdC, polyvinyl acetate, and also their copolymers, if appropriate partially hydrolyzed polyvinyl alcohol, polyvinyl acetals, polyvinyl acetates, polyvinylpyrrolidone, polyvinyl ethers, polyvinyl acrylates and polyvinyl methacrylates in solution and as dispersion, and also their copolymers, polyacrylates and polystyrene copolymers; polystyrene (impact-modified or non-impact-modified); polyurethanes, uncrosslinked or crosslinked with isocyanates; polyurethane acrylates; styrene-acrylic copolymers; styrene-butadiene block copolymers (for example STYROFLEX® or STYROLUX® from BASF SE, K-RESIN™ from CPC); proteins, e.g. casein; SIS, SPS block copolymers; triazine resin, bis-maleimide-triazine (BT) resin, cyanate ester (CE) resin, allylated polyphenylene ether (APPE). Mixtures of two or more polymers may also form the matrix material.

In addition, it is also possible to use hyperbranched polyurethanes as binders. In this case, it is possible to use any desired suitable hyperbranched polymers, preferably the compounds described in WO 02/36695.

The thermomagnetic powder can be incorporated into the binder in any desired suitable manner, with the aid of customary apparatus such as kneaders, dissolvers, rotor-stator mixers or stirred ball mills. In this case, the molding material has to be dispersed in a suitable solvent or a solvent mixture, the solvent selected depending on the solubility of the binder and the particular printing process.

Suitable solvents are, for example, aliphatic and aromatic hydrocarbons (for example n-octane, cyclohexane, toluene, xylene), alcohols (for example methanol, ethanol, 1-propanol, 2-propanol, 1-butanol, 2-butanol, amyl alcohol), polyhydric alcohols such as glycerol, ethylene glycol, propylene glycol, neopentyl glycol, alkyl esters (for example methyl acetate, ethyl acetate, propyl acetate, butyl acetate, isobutyl acetate, isopropyl acetate, 3-methylbutanol), alkoxy alcohols (for example methoxypropanol, methoxybutanol, ethoxypropanol), alkylbenzenes (for example ethylbenzene, isopropylbenzene), butylglycol, butyldiglycol, alkylglycol acetates (for example butylglycol acetate, butyldiglycol acetate), dimethylformamide (DMF), diacetone alcohol, diglycol dialkyl ethers, diglycol monoalkyl ethers, dipropylene glycol dialkyl ethers, dipropylene glycol monoalkyl ethers, diglycol alkyl ether acetates, dipropylene glycol alkyl ether acetate, dioxane, dipropylene glycol and ethers, diethylene glycol and ethers, DBE (dibasic esters), ethers (for example diethyl ether, tetrahydrofuran), ethylene chloride, ethylene glycol, ethylene glycol acetate, ethylene glycol dimethyl ester, cresol, lactones (for example butyrolactone), ketones (for example acetone, 2-butanone, cyclohexanone, methyl ethyl ketone (MEK), methyl isobutyl ketone (MIBK)), methyldiglycol, methylene chloride, methylene glycol, methyl glycol acetate, methylphenol (ortho-, meta-, para-cresol), pyrrolidones (for example N-methyl-2-pyrrolidone), propylene glycol, propylene carbonate, carbon tetrachloride, toluene, trimethylolpropane (TMP), aromatic hydrocarbons and mixtures, aliphatic hydrocarbons and mixtures, alcoholic monoterpenes (for example terpineol), water and mixtures of two or more of these solvents.

Preferred solvents are alcohols (for example ethanol, 1-propanol, 2-propanol, butanol), alkoxy alcohols (for example methoxypropanol, ethoxypropanol, butylglycol, butyldiglycol), butyrolactone, diglycol dialkyl ethers, diglycol monoalkyl ethers, dipropylene glycol dialkyl ethers, dipropylene glycol monoalkyl ethers, propylene glycol monoalkyl ethers, esters (for example ethyl acetate, butyl acetate, butyl glycol acetate, butyldiglycol acetate, diglycol alkyl ether acetates, dipropylene glycol alkyl ether acetates, propylene glycol alkyl ether acetate, DBE), ethers (for example tetrahydrofuran), polyhydric alcohols such as glycerol, ethylene glycol, propylene glycol, neopentyl glycol, ketones (for example acetone, methyl ethyl ketone, methyl isobutyl ketone, cyclohexanone), hydrocarbons (for example cyclohexane, ethyl benzene, toluene, xylene), DMF, N-methyl-2-pyrrolidone, water and mixtures thereof.

The dispersion may further comprise a dispersant component. This consists of one or more dispersants.

In principle, all dispersants which are known to those skilled in the art for use in dispersions and are described in the prior art are suitable. Preferred dispersants are surfactants or surfactant mixtures, for example anionic, cationic, amphoteric or nonionic surfactants.

Cationic and anionic surfactants are described, for example, in "Encyclopedia of Polymer Science and Technology", J. Wiley & Sons (1966), volume 5, pages 816 to 818, and in "Emulsion Polymerisation and Emulsion Polymers", editors: P. Lovell and M. El-Asser, Verlag Wiley & Sons (1997), pages 224 to 226.

However, it is also possible to use, as dispersants, polymers which have anchor groups with pigment affinity and are known to those skilled in the art.

In addition, it is possible to use further additives such as thixotropic agents, for example silica, silicates, for example aerosils or bentonites, or organic thixotropic agents and thickeners, for example polyacrylic acid, polyurethanes, hydrogenated castor oil, dyes, fatty acids, fatty acid amides, plasticizers, wetting agents, defoamers, lubricants, desiccants, crosslinkers, complexing agents, waxes, pigments.

In addition to the customary printing methods, it is also possible to use rapid prototyping/3D printing processes.

A person skilled in the art is aware, under the name of "rapid prototyping" (RP), of a manufacturing process for prototypes, with which it is possible to directly and rapidly produce even very high-detail workpieces of virtually any desired geometry from available CAD data, as far as possible without resorting to manual methods or molds. The principle of rapid prototyping is based on the layer-by-layer buildup of components utilizing physical and/or chemical effects. Numerous processes have become established, for example selective laser sintering (SLS) or stereolithography (SLA). The processes themselves differ in relation to the material with which the layers are built up (polymers, resins, paper webs, powders, etc.) and the method with which these materials are bonded (laser, heating, binder or binder systems, etc.). The processes are described in numerous publications.

One of the rapid prototyping processes is described in EP-A0431 924 and comprises the layer-by-layer buildup of three-dimensional components from powder and binder. Unbound powder is removed at the end, and the workpiece remains in the desired geometry.

WO 2004/112988 discloses that it is also possible to use more than one pulverulent starting material, and US 2005/0017394 discloses the use of activating agents which induce the curing of the binder.

R. Knitter et al. describe, inter alia, in Galvanotechnik 1/2004, p. 196 to 204, ceramic reactors for use in microreactor technology. The forming is effected here by means of a rapid prototyping process chain, except that, as additional intermediate steps, 1.), the original plastic model obtained by stereolithography is copied into a silicone mold, which then 2.) functions as the negative mold in the low-pressure injection molding step using a ceramic slip. The ceramic microreactors obtained serve, inter alia, as catalyst supports to which the actual catalysts are applied, for example, as a suspension. The disadvantage of this production process is the additional process step in which the negative mold is first produced, before the final production is effected in the form of casting.

In cfi/Ber. DKG 82 (2005) no. 13, p. 99 to 103, U. Kaufmann et al. disclose the production of 3D ceramic components by means of a process based on the layer-by-layer buildup of the components in a powder bed. Possible applications of these components as implants are discussed.

For example, the form bodies are obtainable by a method comprising the steps of:
a) producing a form body by means of a powder-based rapid prototyping process, from the following steps, which should be repeated until the desired form body is formed completely from the individual layers: applying a pulverulent starting material or starting material mixture with a mean particle size in the range from about 0.5 µm to 450 µm in a thin layer to a substrate and then admixing, at selected sites on this layer, with a binder and any assistants required, or irradiating or treating in another way, such that the powder is bonded at these sites, as a result of which the powder is bonded both within the layer and to the adjacent layers, repeating this operation until the desired form of the workpiece is completely reproduced in the powder bed formed, removing the powder not bonded by the binder, such that the bonded powder remains in the form of the desired form body,
b) optionally performing a thermal treatment, preferably sintering and/or calcination of the form body, it being possible to perform a binder removal first,
c) optionally applying at least one catalytically active component to the form body,
d) optionally performing a further thermal treatment,
where steps b), c) and/or d) can be performed more than once.

According to the conditions required, the form bodies can be produced tailored to the application, which is not possible with conventional techniques such as extrusion or injection molding. The advantage of the rapid prototyping technology over these conventional manufacturing techniques is that it is theoretically possible to convert any desired geometry, including complex components with microchannels, by means of a CAD data set, under computer control, to the corresponding three-dimensional component without preceding casting in molds, and without cutting, machining, grinding, soldering, etc. In this way, it is possible to produce form bodies which, owing to their optimized geometries, offer advantages for heat and mass transfer.

In the rapid prototyping process, pulverulent starting materials are used. It is possible to use either monodisperse or polydisperse powder. By the nature of finer particles, it is possible to implement thinner layers, as a result of which, for the buildup of a desired form body, a greater number of layers and hence a higher spatial resolution is possible than with coarser particles. Preference is given to powders with a mean particle size in the range from about 0.5 µm to about 450 µm, more preferably of about 1 µm to about 300 µm and most preferably of 10 to 100 µm. The powder for use may, if required, also be pretreated in a controlled manner, for example by at least one of the steps of calcining, compacting, mixing, granulating, sieving, agglomerating or grinding to a particular particle size fraction.

The rapid prototyping process is known to consist of the following steps, which should be repeated until the desired form body has been formed completely from the individual layers. A pulverulent starting material or starting material mixture is applied to a substrate in a thin layer and then, at selected sites on this layer, admixed with a binder and any assistants required, or irradiated or treated in another way, such that the powder is bonded at these sites, as a result of which the powder is bonded both within the layer and to the adjacent layers. Once this operation has been repeated until the desired form of the workpiece has been reproduced completely in the powder bed formed, the powder not bound by the binder is removed, and the bonded powder remains in the desired form.

Advantageous binders are organic materials, particularly those which can be crosslinked or can enter into a covalent bond with one another in another way, for example phenolic resins, polyisocyanates, polyurethanes, epoxy resins, furan resins, urea-aldehyde condensates, furfuryl alcohol, acrylic acid and acrylate dispersions, polymeric alcohols, peroxides, carbohydrates, sugars, sugar alcohols, proteins, starches, caboxymethylcellulose, xanthan, gelatin, polyethylene glycol, polyvinyl alcohols, polyvinylpyrrolidone or mixtures thereof.

The binders are used in liquid form, either in dissolved or dispersed form, it being possible to use either organic solvents (e.g. toluene) or water.

The binder is applied, for example, via a nozzle, a print head or another apparatus which allows exact positioning of very small droplets of the binder on the powder layer. The ratio of amount of powder to amount of binder varies as a function of the substances used and is generally in the range from about 40:60 to about 99:1 parts by weight, preferably in the range from about 70:30 to about 99:1 parts by weight, more preferably in the range from about 85:15 to about 98:2 parts by weight.

In addition, it is optionally possible to use one or more assistants which may, for example, have an influence on the crosslinking of the binders or serve as hardeners. The assistants used are especially water, inorganic acids or bases, but also rapidly hydrolyzable or condensable compounds. The assistants can be applied separately, but they can optionally also be added to the powder bed and/or to the binder or to the binder solution.

Reference may be made to the following literature: Gebhardt, Rapid Prototyping, Werkzeuge für die schnelle Produktentstehung, Carl Hansa Verlag Munich, 2000, J. G. Heinrich, New Developments in the Solid Freeform Fabrication of Ceramic Components, cfi/Ber. DKG 66 (1999), pages 29 to 35, R. Knitter, W. Bauer, Keramische Reaktoren für den Einsatz in der Mikroreaktor-Technik, Nachrichten-Forschungszentrum Karlsruhe 34 (2002), pages 143 to 152, A. Nagy, R. Lenk, Rapid Prototyping-Fertigungsverfahren für die schnelle Bereitstellung keramischer Funktionsmuster, in: Kriegesmann (editor), Technische keramische Werkstoffe, 2004, ke 12/2005, pages 54 to 55, Maßstäbe gesetzt im Rapid Prototyping, see also "Rapid Prototyping" in www.werkstoffzentrum.de.

After the completion of the form body, it is optionally subjected to a thermal treatment, which can also be done in a plurality of stages or by a temperature program or profile. Generally, the thermal treatment is effected in the range from about 300 to 2100° C. For example, the powder bed with the form body present therein can first be heated to a temperature in the range from 300 to 700° C., preferably from 300 to 550° C. In the course of this, the crosslinking of the binder should be completed, for example by hydrolysis and/or condensation with elimination of water or alcohols, and organic constituents can be removed at least partly by oxidation. This may be followed by a second temperature stage, which generally comprises heating to a temperature of 900 to 2100° C., preferably from 1100 to 1800° C. This is within the range of sintering, in which the powder particles enter into bonds with one another and the mechanical strength of the form body is thus increased. The sintering process may cause a certain degree of shrinkage, which should be taken into account by the CAD model in the course of printing. The powder not bound by the binder must be removed no later than before the sintering step; this can be done, for example, by means of compressed air or expulsion by blowing. The bound powder then remains in the desired form. The second temperature stage can be selected such that the resulting material has a high or a low porosity. According to the requirements of the reaction to be catalyzed, mechanical stability, structure and porosity of the material can be optimized by this step.

The particular printing methods are controlled so as to result in form bodies which have a suitable combination of high heat transfer, low flow resistance and high magnetocaloric density. Preference is given to an optimal ratio of high magnetocaloric density and sufficient porosity, so as to ensure efficient heat removal and efficient heat exchange. In other words, the inventive form bodies exhibit a high ratio of surface to volume. By virtue of the high surface area, it is possible to transport large amounts of heat out of the material and to transfer them into a heat transfer medium. The structure should be mechanically stable in order to cope with the mechanical stresses by a fluid cooling medium. In addition, the flow resistance should be sufficiently low as to result in only a low pressure drop through the porous material. The magnetic field volume should preferably be minimized.

The form bodies obtained in accordance with the invention are preferably used in refrigerators, air conditioning units, heat pumps or heat exchangers, or in power generation by direct conversion of heat. The materials should exhibit a large magnetocaloric effect within a temperature range between −100° C. and +150° C.

The heat transfer rate limits the cycle speed and hence has a great influence on the power density.

In power generation, a coil of an electrically conductive material is arranged around the thermomagnetic material. In this coil, a current is induced through alteration of the magnetic field or of the magnetization, and can be used to perform electrical work. Preference is given to selecting the coil geometry and the geometry of the thermomagnetic material so as to result in a maximum energy yield with minimum pressure drop. The coil winding density (turns/length), the coil length, the charge resistance and the temperature change of the thermomagnetic material are important influencing parameters for the energy yield.

The thermomagnetic material is present in an external magnetic field. This magnetic field can be generated by permanent magnets or electromagnets. Electromagnets may be conventional electromagnets or superconductive magnets.

The thermomagnetic generator is preferably designed such that the thermal energy from geothermal sources or from the waste heat of industrial processes or from solar energy or solar collectors can be converted, for example, in photovoltaics. Specifically in regions with geothermal activity, the inventive thermomagnetic generator allows simple power generation exploiting geothermal heat. In industrial processes, process heat or waste heat frequently arises, which is typically discharged to the environment and is not utilized further. Wastewaters frequently also have a higher temperature on exit than on entry. The same applies to cooling water. The thermomagnetic generator thus allows the recovery of electrical energy from waste heat which is otherwise lost. By virtue of the fact that the thermomagnetic generator can be operated in the region of room temperature, it is possible to utilize this waste heat and to convert it to electrical energy. The energy conversion is effected preferably at temperatures in the range from 20 to 150° C., more preferably at temperatures in the range from 40 to 120° C.

In (concentrated) photovoltaic systems, high temperatures are frequently attained, such that it is necessary to cool. This heat to be removed can be converted to power in accordance with the invention.

For power generation, the thermomagnetic material is contacted alternately with a warm reservoir and a cool reservoir and hence subjected to a warming and cooling cycle. The cycle time is selected according to the particular technical prerequisites.

Examples 1 and 2 which follow describe the production of thermomagnetic materials suitable for the inventive application, the examples 3 and 4 the production of the desired structures by rapid prototyping.

EXAMPLES

Example 1

Evacuated quartz ampoules which comprised pressed samples of MnFePGe were kept at 1100° C. for 10 hours in order to sinter the powder. This sintering was followed by heat treatment at 650° C. for 60 hours in order to bring about homogenization. Instead of slow cooling in the oven to room temperature, the samples were, however, immediately quenched in water at room temperature. The quenching in water caused a certain degree of oxidation at the sample surfaces. The outer oxidized shell was removed by etching with dilute acid. The XRD patterns showed that all samples crystallized in a structure of the $Fe_2P$ type.

The following compositions were obtained:
$Mn_{1.1}Fe_{0.9}P_{0.81}Ge_{0.19}$; $Mn_{1.1}Fe_{0.9}P_{0.78}Ge_{0.22}$, $Mn_{1.1}Fe_{0.9}P_{0.75}Ge_{0.25}$ and $Mn_{1.2}Fe_{0.8}P_{0.81}Ge_{0.19}$. The values observed for the thermal hysteresis are 7 K, 2 K and 3 K for these samples in the given sequence. Compared to a slowly cooled sample, which has a thermal hysteresis of more than 10 K, the thermal hysteresis has been greatly reduced.

The thermal hysteresis was determined in a magnetic field of 0.5 tesla.

FIG. 1 shows the isothermal magnetization of $Mn_{1.1}Fe_{0.9}B_{0.78}Ge_{0.22}$ close to the Curie temperature with a rising magnetic field. Field-induced transition behavior which leads to a large MCE is observed for magnetic fields of up to 5 tesla.

The Curie temperature can be adjusted by varying the Mn/Fe ratio and the Ge concentration, as can the value of the thermal hysteresis.

The change in the magnetic entropy, calculated from the direct current magnetization using the Maxwell relationship, for a maximum field change of from 0 to 2 tesla, is 14 J/kgK, 20 J/kgK and 12.7 J/kgK respectively for the first three samples.

The Curie temperature and the thermal hysteresis decrease with increasing Mn/Fe ratio. As a result, the MnFePGe compounds exhibit relatively large MCE values in a low field. The thermal hysteresis of these materials is very low.

Example 2

Melt-spinning of MnFeP(GeSb)

The polycrystalline MnFeP(Ge,Sb) alloys were first produced in a ball mill with high energy input and by solid phase reaction methods, as described in WO 2004/068512 and J. Appl. Phys. 99,08 Q107 (2006). The material pieces were then introduced into a quartz tube with a nozzle. The chamber was evacuated to a vacuum of $10^{-2}$ mbar and then filled with high-purity argon gas. The samples were melted by means of a high frequency and sprayed through the nozzle owing to a pressure difference to a chamber containing a rotating copper drum. The surface speed of the copper wheel was adjustable, and cooling rates of about $10^5$ K/s were achieved. Subsequently, the spun ribbons were heat treated at 900° C. for one hour.

X-ray diffractometry reveals that all samples crystallize in the hexagonal $Fe_2P$ structure pattern. In contrast to samples not produced by the melt-spinning method, no smaller contaminant phase of MnO was observed.

The resulting values for the Curie temperature, the hysteresis and the entropy were determined for different peripheral speeds in the melt-spinning. The results are listed in Tables 1 and 2 which follow. In each case, low hysteresis temperatures were determined.

Example 3

The basis is a thermomagnetic material powder which is mixed with a 200 mesh xanthan solid binder (from König & Wiegand, 40472 Dusseldorf) with the aid of a Turbula mixer (Willy A. Bachofen Ag, 4058 Basle, Switzerland). The proportion of the solid binder is 10% by weight, based on the thermomagnetic powder. The three-dimensional printing is performed with a Z-printer 310 (Z-Corporation, Burlington, Mass. 01803, USA) using a water-based ZB 54 binder solution (Z-Corporation, Burlington, Mass. 01803, USA). 2% of the liquid binder is used. After the printing, the parts are first dried at 60° C. over 8 h and then blown dry with compressed air. The sintering is effected at 1600° C. with hold time 2 h.

Example 4

The forming by means of rapid prototyping is effected on the ProMetal RCT S15 (from ProMetal RCT GmbH, 86167 Augsburg) by alternating application of powder and binder layer. The powder used is a thermomagnetic material and the binder a furan resin-acid mixture. This binder mixture of Askuran 120 (from Ashland-Südchemie, 40721 Hilden) and RPT 100 (from Ashland-Südchemie, 40721 Hilden) is used in a mixing ratio of 100:40, the resin being added to the powder and the hardener being metered in via the print head nozzles. An amount of resin of about 1.5% is added to the amount of powder. The molds are produced by the buildup of numerous layers and are dried at room temperature overnight.

TABLE 1

| | V (m/s) | $T_C$ (K) | $\Delta T_{hys}$ (K) | $-\Delta S$ (J/kgK) |
|---|---|---|---|---|
| Ribbons | | | | |
| $Mn_{1.2}Fe_{0.8}P_{0.73}Ge_{0.25}Sb_{0.02}$ | 30 | 269 | 4 | 12.1 |
| $Mn_{1.2}Fe_{0.8}P_{0.70}Ge_{0.20}Sb_{0.10}$ | 30 | 304 | 4.5 | 19.0 |
| | 45 | 314 | 3 | 11.0 |
| $MnFeP_{0.70}Ge_{0.20}Sb_{0.10}$ | 20 | 306 | 8 | 17.2 |
| | 30 | 340 | 3 | 9.5 |
| $MnFeP_{0.75}Ge_{0.25}$ | 20 | 316 | 9 | 13.5 |
| | 40 | 302 | 8 | — |
| $Mn_{1.1}Fe_{0.9}P_{0.78}Ge_{0.22}$ | 20 | 302 | 5 | — |
| | 40 | 299 | 7 | — |
| $Mn_{1.1}Fe_{0.9}P_{0.75}Ge_{0.25}$ | 30 | 283 | 9 | 11.2 |
| $Mn_{1.2}Fe_{0.8}P_{0.75}Ge_{0.25}$ | 30 | 240 | 8 | 14.2 |
| $Mn_{1.1}Fe_{0.9}P_{0.73}Ge_{0.27}$ | 30 | 262 | 5 | 10.1 |
| Bulk | | | | |
| $MnFeP_{0.75}Ge_{0.25}$ | | 327 | 3 | 11.0 |
| $Mn_{1.1}Fe_{0.9}P_{0.81}Ge_{0.19}$ | | 260 | 7 | 14.0 |
| $Mn_{1.1}Fe_{0.9}P_{0.78}Ge_{0.22}$ | | 296 | 5 | 20.0 |
| $Mn_{1.1}Fe_{0.9}P_{0.75}Ge_{0.25}$ | | 330 | 2 | 13.0 |
| $Mn_{1.2}Fe_{0.8}P_{0.81}Ge_{0.19}$ | | 220 | 3 | 7.7 |
| $Mn_{1.2}Fe_{0.8}P_{0.75}Ge_{0.25}$ | | 305 | 3 | — |
| $Mn_{1.2}Fe_{0.8}P_{0.73}Ge_{0.27}$ | | 313 | 5 | — |
| $Mn_{1.3}Fe_{0.7}P_{0.78}Ge_{0.22}$ | | 203 | 3 | 5.1 |
| $Mn_{1.3}Fe_{0.7}P_{0.75}Ge_{0.25}$ | | 264 | 1 | — |

TABLE 2

| | $T_C$ (K) | $\Delta T_{hys}$ (K) | $-\Delta S$ (J/kgK) |
|---|---|---|---|
| Bulk | | | |
| $MnFeP_{0.75}Ge_{0.25}$ | 327 | 3 | 11.0 |
| $Mn_{1.16}Fe_{0.84}P_{0.75}Ge_{0.25}$ | 330 | 5 | 22.5 |
| $Mn_{1.18}Fe_{0.82}P_{0.75}Ge_{0.25}$ | 310 | 3 | 16.1 |
| $Mn_{1.20}Fe_{0.80}P_{0.75}Ge_{0.25}$ | 302 | 1 | 12.0 |
| $Mn_{1.22}Fe_{0.78}P_{0.75}Ge_{0.25}$ | 276 | 4 | 11.7 |
| $Mn_{1.26}Fe_{0.74}P_{0.75}Ge_{0.25}$ | 270 | 1 | 8.5 |
| $Mn_{1.1}Fe_{0.9}P_{0.81}Ge_{0.19}$ | 260 | 6 | 13.8 |
| $Mn_{1.1}Fe_{0.9}P_{0.78}Ge_{0.22}$ | 296 | 4 | 20.0 |
| $Mn_{1.1}Fe_{0.9}P_{0.77}Ge_{0.23}$ | 312 | 2 | 14.6 |
| $Mn_{1.1}Fe_{0.9}P_{0.75}Ge_{0.25}$ | 329 | 2 | 13.0 |
| Ribbons | | | |
| $Mn_{1.20}Fe_{0.80}P_{0.75}Ge_{0.25}$ | 288 | 1 | 20.3 |
| $Mn_{1.22}Fe_{0.78}P_{0.75}Ge_{0.25}$ | 274 | 2 | 15.3 |
| $Mn_{1.24}Fe_{0.76}P_{0.75}Ge_{0.25}$ | 254 | 2 | 16.4 |
| $Mn_{1.26}Fe_{0.74}P_{0.75}Ge_{0.25}$ | 250 | 4 | 14.4 |
| $Mn_{1.30}Fe_{0.70}P_{0.75}Ge_{0.25}$ | 230 | 0 | 9.8 |

The invention claimed is:

1. A method for producing a form body for a heat exchanger, comprising:
   a) applying a powder starting material or powder starting material mixture to a substrate in a thin layer and then, at selected sites on the layer, bonding the powder such that the powder is bonded both within the layer and to adjacent layers by a method selected from the group consisting of admixing with a binder and optional assistant, irradiation, and combinations thereof, such that the powder is bonded at the selected sites;
   b) repeating a) until a form body is formed in a powder bed;
   c) removing powder which is not bonded;
   d) optionally thermally treating said form body;
   e) optionally applying at least one catalytically active component to said form body;
   f) optionally performing a further thermal treatment,
   wherein
   the form body has channels for passage of a fluid heat exchange medium;
   said powder starting material and/or said powder starting material mixture comprise a thermomagnetic material;
   a plurality of different thermomagnetic materials are applied alongside e another and/or one on top of another, such that different thermomagnetic materials which exhibit a magnetocaloric effect at different temperatures are present in the same form body; and
   the thermomagnetic material is selected from the group consisting of:
   a compound of formula (I)

$$(A_yB_{1-y})_{2+\delta}C_wD_xE_z \qquad (I)$$

where
   A is Mn or Co,
   B is Fe, Cr or Ni,
   C, D and E at least two of C, D and E are different, have a non-vanishing concentration and are selected from the group consisting of P, B, Se, Ge, Ga, Si, Su, N, As and Sb,
   $\delta$ is a number in the range from −0.2 to 0.2,
   w, x, y, z are numbers in the range from 0 to 1, where w+x+z=1;
   (2) a La- and Fe-based compound of formulae (II) and/or (III) and/or (IV)

$$La(Fe_xAl_{1-x})_{13}H_y \text{ or } La(Fe_xSi_{1-x})_{13}H_y \qquad (II)$$

where
   x is a number from 0.7 to 0.95,
   y is a number from 0 to 3;

$$La(Fe_xAl_yCo_z)_{13} \text{ or } La(Fe_xSi_yCo_z)_{13} \qquad (III)$$

where
   x is a number from 0.7 to 0.95,
   y is a number from 0.05 to 1−x,
   z is a number from 0.005 to 0.5;

$$LaMn_xFe_{2-x}Ge \qquad (IV)$$

where
   x is a number from 1.7 to 1.95;
   (3) an Heusler alloy of the MnTP type where T is a transition meta and P is a p-doping metal having an electron count per atom e/a in the range from 7 to 8.5;
   (4) a Gd- and Si-based compound of formula (V)

$$Gd_5(Si_xGe_{1-x})_4 \qquad (V)$$

where x is a number from 0.2 to 1;
   (5) a $Fe_2P$-based compound;
   (6) a manganite of the perovskite type;
   (7) compounds which comprise rare earth elements and are of formulae (VI) and (VII)

$$Tb5(Si_{4-x}Ge_x) \qquad (VI)$$

where x=0, 1, 2, 3, 4, $$XTiGe \qquad (VII)$$

where X=Dy, Ho, Tm; and
   (8) Mn- and Sb- or As-based compounds of formulae (VIII) and (IX)

$$Mn_{2-x}Z_xSb \qquad (VIII)$$

$$Mn_2Z_xSb_{1-x} \qquad (IX)$$

where
   Z is Cr, Cu, Zn, Co, V, Ge,
   x is from 0.01 to 0.5,
   where Sb may be replaced by As when Z is not As.

2. The method according to claim 1, wherein a three-dimensional arrangement of different thermomagnetic materials along at least one spatial axis is effected such that the result is a quasicontinuous rise or decline in the temperature at which the magnetocaloric effect occurs in each case along this at least one spatial axis.

3. The method according to claim 1, wherein the powder of the thermomagnetic material has a mean particle size in the range from 0.1 to 100 µm.

4. The method according to claim 1, wherein the thermomagnetic material is an at least quaternary compound of the formula (I) and which comprises Mn, Fe, P and optionally Sb, and further comprises
- (i) Ge, or
- (ii) Si, or
- (iii) As, or
- (iv) Ge and Si, or
- (v) Ge and As, or
- (vi) Si and As, or
- (vii) Ge, Si and As.

5. The method according to claim 1, wherein the channels in the form body have a mean diameter in the range from 0.1 to 2000 µm.

6. The method according to claim 1, wherein the channels are configured so as to provide one or more inlet and outlet orifices for the fluid heat exchange medium, and the channels are arranged such that they allow substantially homogeneous temperature control of the form body.

7. The method according to claim 1, wherein said optional assistant is present and is at least one assistant selected from the group consisting of an additive for improving the mechanical properties, an additive for improving corrosion resistance and an additive for improving conductivity.

\* \* \* \* \*